(12) United States Patent
Zucchini

(10) Patent No.: US 6,336,626 B1
(45) Date of Patent: Jan. 8, 2002

(54) STIRRUP SUSPENSION

(75) Inventor: Michael R. Zucchini, Rancho Santa Fe, CA (US)

(73) Assignee: Moonraker Farm, Inc., Rancho Sante Fe, CA (US)

( * ) Notice: Subject to any disclaimer, the term of this patent is extended or adjusted under 35 U.S.C. 154(b) by 0 days.

(21) Appl. No.: 09/436,574

(22) Filed: Nov. 9, 1999

Related U.S. Application Data
(60) Provisional application No. 60/144,537, filed on Jul. 19, 1999.

(51) Int. Cl.[7] .............................. F16F 1/00; F16F 9/00
(52) U.S. Cl. ............................ 267/70; 54/48; 267/73
(58) Field of Search ............................ 54/48; 267/69, 267/70, 71, 72, 73, 74

(56) References Cited

U.S. PATENT DOCUMENTS

| | | | | |
|---|---|---|---|---|
| 23,572 A | * | 4/1859 | Hamersley | 54/48 |
| 66,106 A | * | 6/1867 | Revere | 54/48 |
| 367,696 A | * | 8/1887 | Bull | 54/48 |
| 379,747 A | * | 3/1888 | Welcome | 54/48 |
| 409,558 A | * | 8/1889 | Bull | 54/48 |
| 578,956 A | | 3/1897 | Vann | |
| 592,588 A | * | 10/1897 | Hollister | 54/48 |
| 624,327 A | * | 5/1899 | Hammond | 267/70 |
| 706,468 A | | 8/1902 | Wellman | |
| 807,000 A | | 1/1905 | Southworth | |
| 1,222,480 A | * | 4/1917 | Smith | 267/70 |
| 2,109,209 A | | 2/1938 | Douglas | |
| 2,373,125 A | * | 4/1945 | Loepsinger | 267/70 |
| 4,697,798 A | * | 10/1987 | Pitter et al. | 267/70 |
| 4,936,081 A | * | 6/1990 | Jones | 54/48 |
| 4,955,309 A | * | 9/1990 | Ciccone | 267/70 |
| 5,653,426 A | * | 8/1997 | Meisel | 267/71 |

* cited by examiner

Primary Examiner—Robert J. Oberleitner
Assistant Examiner—Devon Kramer
(74) Attorney, Agent, or Firm—Barlow, Josephs & Holmes, Ltd.

(57) ABSTRACT

An improved stirrup suspension utilizes a multi-stage spring suspension to accommodate the different downward forces generated during normal riding as well as jumping. The stirrup suspension includes a housing having a bottom wall and continuous side wall, a slide member slidably received within the housing, a stirrup connector mounted to the lower end of said slide member, a first spring element received around the slide member, and a second spring element also received around said slide member. The first spring element is effective for exerting a force F1 under a minimum load while the second spring element is effective for exerting a force F2 that is greater than F1 under a minimum load. In use, the lower end of the slide member is attached to the stirrup which will move up and down relative to the housing. The slide member slidably moves within housing where a flange member at the top of the slide compresses the first and second spring elements upon the exertion of a downward force on the stirrup.

10 Claims, 5 Drawing Sheets

STIRRUP SUSPENSION

This application claim benefit to Provisional application No. 60/144,537 filed Jul. 19, 1999.

BACKGROUND AND SUMMARY OF THE INVENTION

The instant invention relates to horse back riding, and in particular relates to a stirrup suspension including a first suspension spring designed to absorb the downward forces attendant to normal riding conditions, and a second more rigid suspension spring designed to absorb the additional downward forces developed during jumping.

Typical equestrian riding gear includes a saddle, and stirrups attached to the saddle for receiving the feet of a rider. The weight of an individual seated upon the saddled horse is distributed through the saddle and the stirrups. In forward motion of the horse, the rider's feet in the stirrups act as a natural suspension system through flexion of the ankle joints. The rider places the ball of his foot on the base of the stirrup and by the controlled flexion of the ankle joint, the rider can create a natural suspension system. This type of riding is most prevalent in English riding, and especially in jumping. Sufficient suspension of the rider is necessary to maintain proper balance for performance purposes as well as safety. In addition, proper suspension avoid unnecessary adverse contact of the rider on the horse's back thereby avoiding injury to the horse. In jumping, the problem is compounded by increased vertical forces generated by vertical movement of the rider's weight, and a concentration of those forces directly through the stirrups. The amount of downward pressure on the stirrups is dependent upon the rider's weight, forward momentum, position, the amount of contact in the seat of the saddle and the height of the jump. The amount of downward forces increases dramatically upon take-off and landing. Accordingly, an individual needs to physically create sufficient natural suspension in two stages: 1) when approaching a jump or shortly after landing; and 2) at take-off and landing of the jump. In stage 1, for example, a 160 lb. rider might create between 25 and 125 lbs./sq.in. of downward force in each stirrup depending on body contact in the saddle. However, when jumping, the rider disperses the weight primarily through the stirrups and generates a significantly higher downward force, which depending on the height of the jump and weight of the rider, can reach up to 300 lbs./sq.in.

The forces generated during riding and jumping should be absorbed through the ankle's natural suspension. However, the drawback to the ankle's natural suspension is that is relies on the physical limitations of the rider. Effectiveness in executing this riding style depends highly on physical flexibility, range of motion, strength, posture, and experience of the rider. Insufficient flexibility and range of motion will clearly result in inferior riding, loss of balance, and potential injury to the horse and/or rider. This is especially apparent in show jumping. In competitive show jumping, a rider navigates around a course containing several jumps, usually more than a dozen, which are set at prescribed heights depending upon the qualifications of the rider. Therefore, in this environment a rider would encounter both normal riding conditions and jumping conditions rapidly interchanging and would experiences frequent and substantial variations in downward force. Rider's with poor ankle control and flexion are often referred to as having "stiff ankles." The most frequent recommendation to improve strength and flexibility is physical therapy, that is exercises to both strengthen the ankle and calf muscles and to stretch the Achilles tendon to expand range of motion.

The prior art has also attempted to provide a variety of energy absorbing devices to remedy the "stiff ankle" problem. These devices have included stirrup suspensions with springs and shock absorbers. While these solutions are effective in some specialized circumstances, they have not yet been widely adopted in the art, and there is thus believed to be a need in the industry, and especially for competitive show jumping, for an improved multi-stage stirrup suspension that can accommodate the different downward forces generated during normal riding as well as jumping.

In this regard, the instant invention provides an improved stirrup suspension that utilizes a multi-stage spring suspension to accommodate the different downward forces generated during normal riding as well as jumping. The stirrup suspension includes a housing, a slide member slidably received within the housing, a stirrup connector mounted to the lower end of the slide member, a first spring element received around the slide member, and a second spring element also received around said slide member. The first spring element is effective for exerting a force $F_1$ that would be typical of the force exerted during normal riding, while the second spring element is effective for exerting a force $F_2$ that is greater than $F_1$ that would be typical of the greater force exerted during jumping landing and take-off. In this regard, it is noted that in stadium jumping, participants compete in different jumping height divisions. For example, there is a 3'6" jump height division, a 4'3" jump height division, etc. Within each division, all of the jumps are relatively the same height. With the factors of rider weight and jumping height being substantially constant, the spring elements can be individually selected and customized according to a rider's weight, height of jumps, and riding style. This is highly advantageous for marketing and sales purposes.

Turning back to the suspension, the lower end of the slide member is attached to the stirrup via a stirrup connector. During riding, the stirrup will move up and down relative to the housing with the slide member slidably moving within housing. A flange member at the top of the slide member compresses the first and second spring elements upon downward movement corresponding to the exertion of a downward force on the stirrup. During normal riding, the first spring is compressed to counter the downward forces exerted. The first spring will be compressed from a minimum load to a maximum load. However, when forces exerted during jumping exceed a percentage of the maximum force (load) on the first spring under compression, the second spring begins to compress to exert additional counter forces. The second spring will thereafter exert forces through its range of minimum compression to maximum compression.

In a first embodiment, the springs are concentrically configured around the slide member. The first, i.e. inner spring, has a longer length, and smaller diameter. The second spring has a shorter length and wider diameter and is received around the first spring. In operation, the flange first compresses the first spring through a range of motion. When the forces are great enough to compress the first spring through a predetermined range of compression, the flange then engages the second spring and begins compressing the second spring. In this regard, the first and second springs are simultaneously compressed and cooperate to exert a combined force against the flange.

In a second embodiment, the first and second springs are of the same length and diameter and are stacked one upon the other, the upper spring comprising the first spring and the lower spring comprising the second spring. In this regard, the first and second springs actively cooperate to exert forces against the flange and both are active at all times, in contrast with the first embodiment where the first spring is active to a certain point and then the second spring becomes active to cooperate with the first spring.

Accordingly, among the objects of the instant invention are: to provide a stirrup suspension for the rider of a horse to create additional suspension over and above what can be achieved physically through the flexion of the ankles; to provide a stirrup suspension that can be customized to individual needs based on body weight and height of jumping; to provide a multi-stage stirrup suspension to accommodate the different levels of downward force that occur during normal riding and jumping; to provide a stirrup suspension that is independent of the stirrup; to provide a stirrup suspension that improves the rider's balance, performance and personal safety; to provide a stirrup suspension that reduces harmful contact with the horse's back; to provide a stirrup suspension that reduces the structural breakdown of the stirrup strap; and to provide a stirrup suspension that reduces strain on the muscle, cartilage and ligaments of the rider's knees, ankles and calves.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
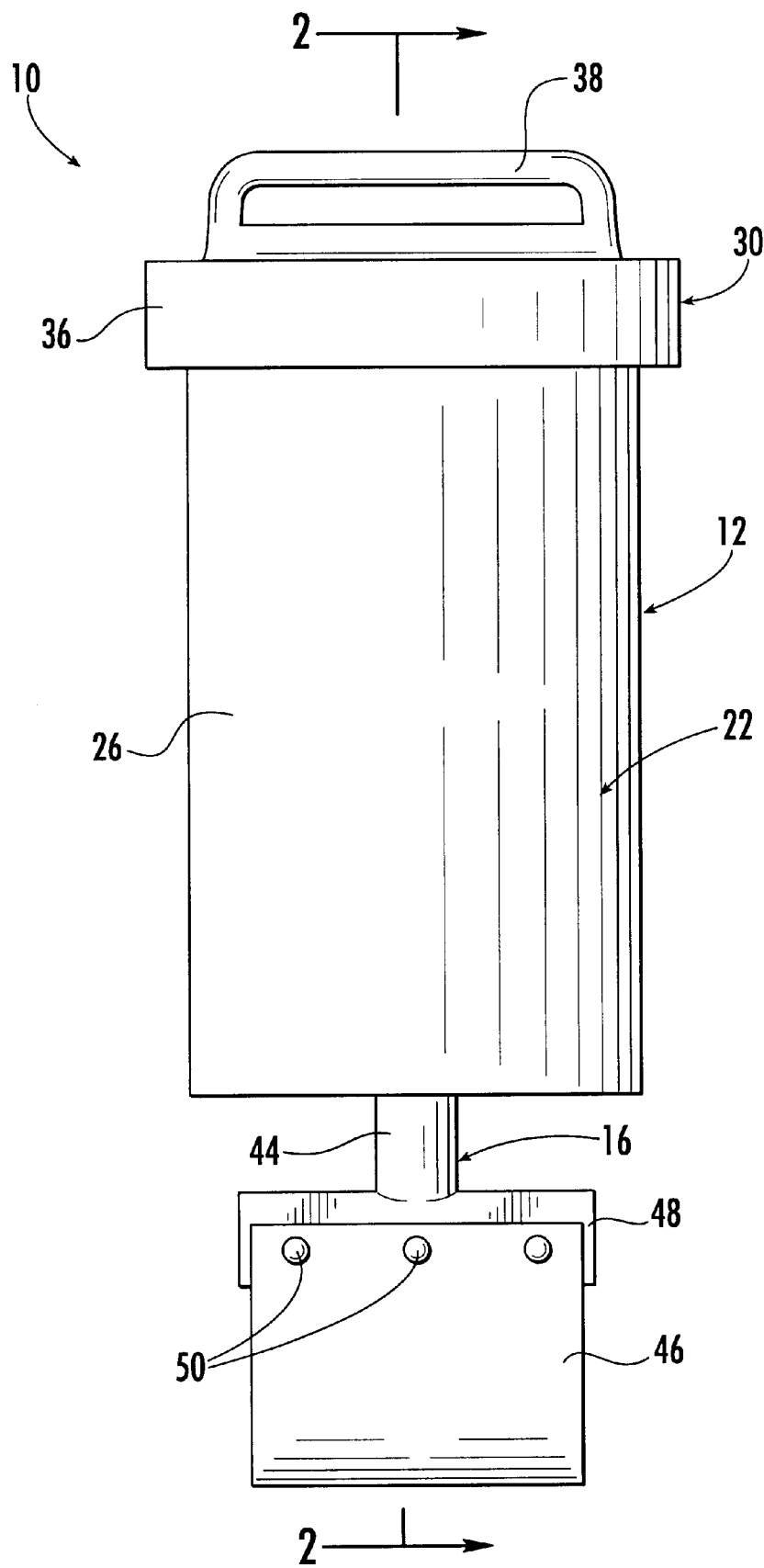
FIG. 1 is an elevational view of the stirrup suspension of the present invention.
Figure 2:
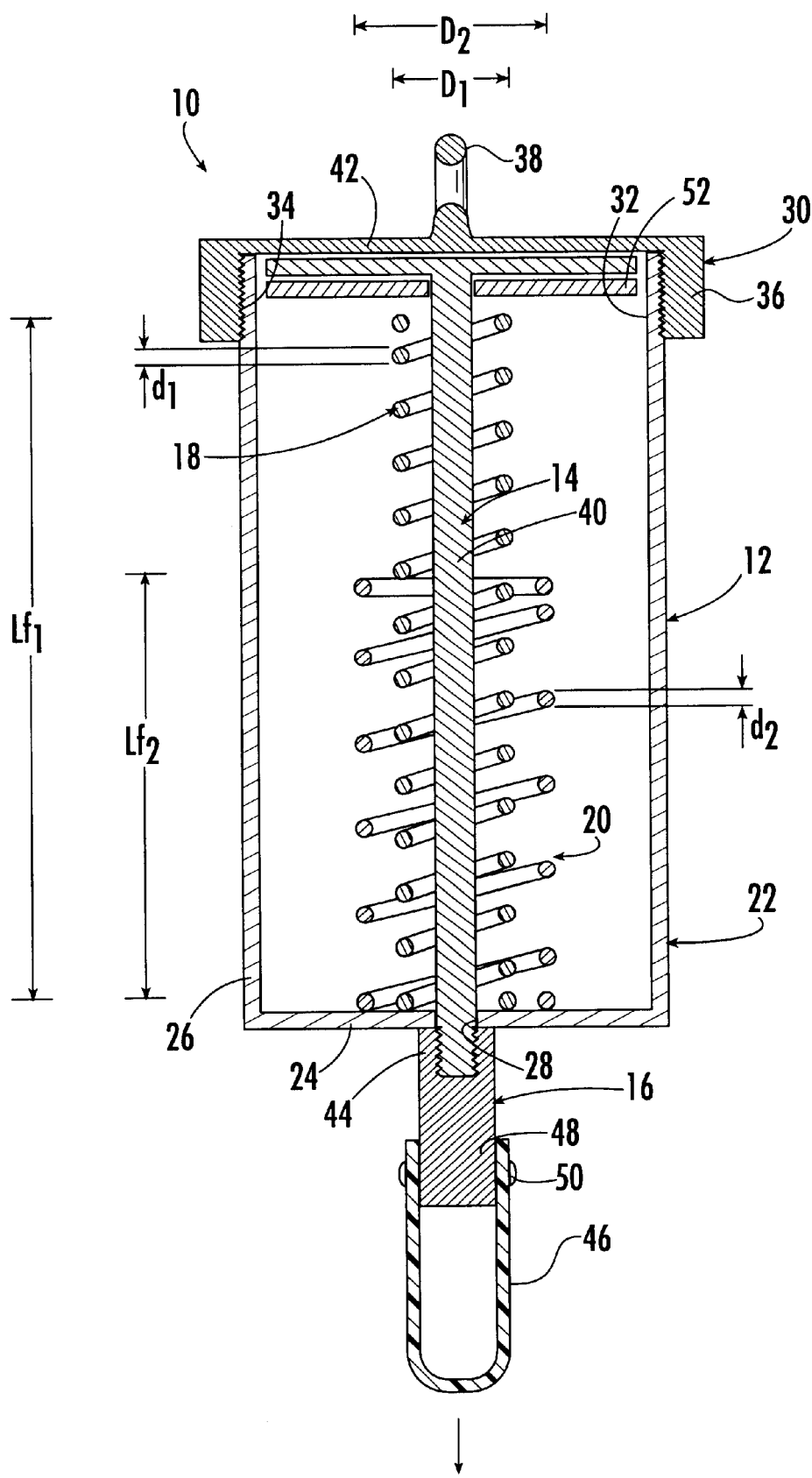
FIG. 2 is a cross-sectional view thereof as taken along line 2—2 of FIG. 1.
Figure 3:
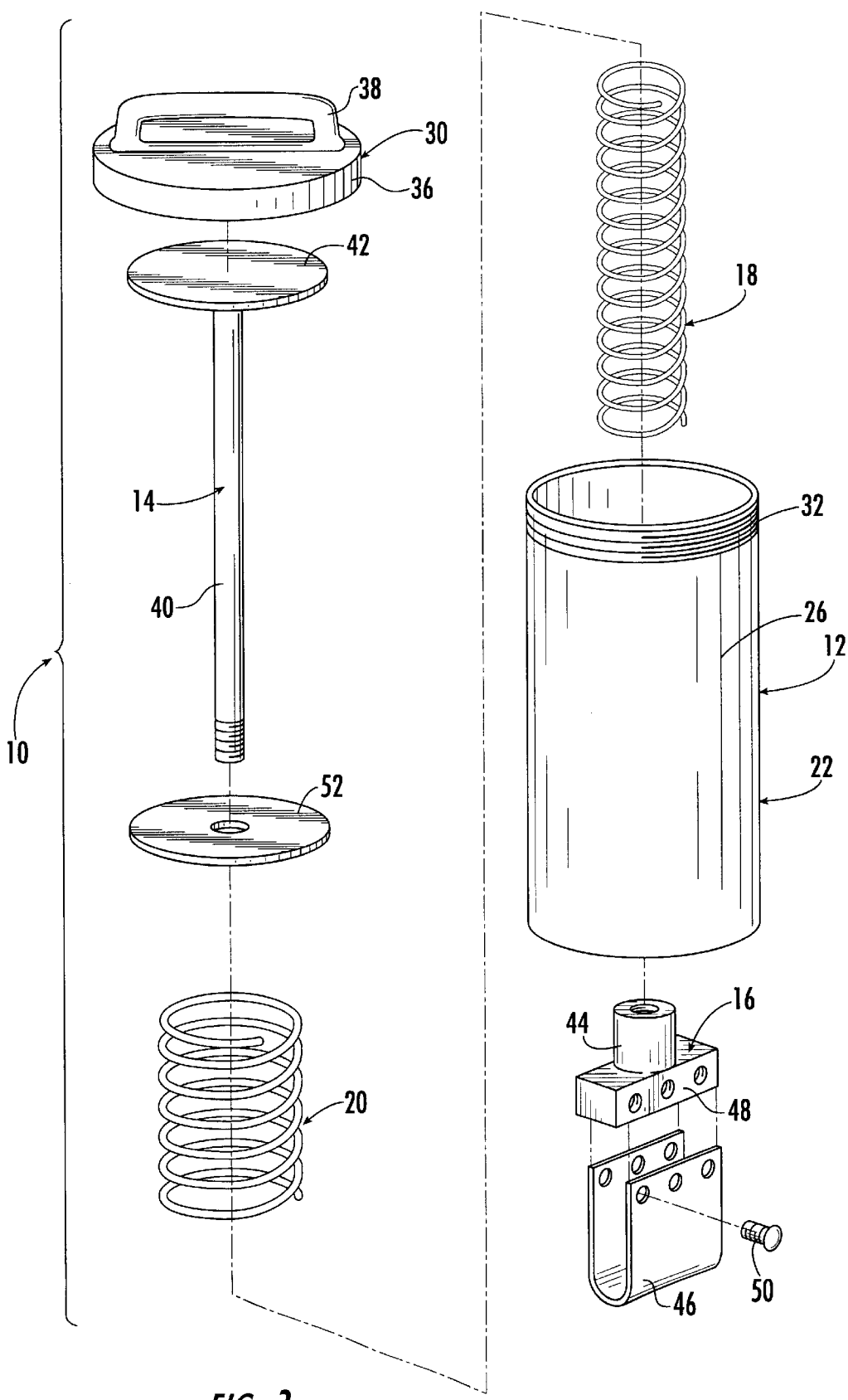
FIG. 3 is an exploded perspective view thereof.

Referring now to the drawings, a first embodiment of a stirrup suspension constructed in accordance with the teachings of the present invention is illustrated and generally indicated at 10 in FIGS. 1–3. As will hereinafter be more fully described, the instant stirrup suspension 10 provides an improved apparatus that utilizes a multi-stage suspension system to accommodate the wide range of downward forces generated during normal riding and jumping.

Unless otherwise specified herein, it is to be understood that each of the constituent elements of the present stirrup suspension are preferably constructed or fabricated from a metallic material. Alternatively, certain elements of the structure could be molded from plastic. However, certain structural integrity and durability issues may preclude certain elements from being constructed from plastic or other materials.

The stirrup suspension 10 includes a housing assembly generally indicated at 12, a slide member generally indicated at 14, a stirrup connector generally indicated at 16, a first spring element generally indicated at 18, and a second spring element generally indicated at 20.

The housing assembly 12 includes a tubular container 22, preferably in the shape of a cylinder, having a bottom wall 24 and a continuous side wall 26 extending upwardly from the bottom wall 24. The container 22 is preferably no longer than about 3 inches in height and about 1.25 inches in diameter. The bottom wall 24 includes an axial opening 28. The housing assembly 12 further includes a cap member 30 which is removably mounted on the upper peripheral edge 32 of the side wall 26. To attach the cap member 30 to the container 22, the upper peripheral edge 32 of the side wall 26 and the inner side wall 34 of the body portion 36 of the cap member 30 are threaded for mating engagement. The upper surface of the cap member 30 includes a slotted formation 38 for connecting the saddle strap (not shown) to the cap member 30.

The slide member 14 comprises an elongate rod portion 40 and a flange portion 42 mounted at the upper end of the rod portion. The slide member is slidably received within the housing assembly 12 with the lower end of the rod portion 40 extending downwardly and outwardly through the opening in the bottom wall. Connected to the bottom end of the rod portion 40 is the stirrup connector element 16. The stirrup connector 16 is generally T-shaped with the leg 44 of the connector 16 being threadably mounted to the lower exposed end of the rod portion 40 of the slide member 14. A stirrup connector strap 46 is mounted to the cross-bar 48 of the connector with fasteners 50. It is envisioned that the stirrup connector straps 46 can be made of various materials and can be fastened to the cross-bar 48 in a variety of different ways.

The first spring element 18 comprises a helical compression spring having a free length $L_{f1}$ of approximately 3 inches, and a coil diameter $D_1$ of approximately 0.5 inch. The wire diameter $d_1$ will vary according to the rider, and is selected to produce the desired forces at minimum and maximum compression according to conventional spring design formulas. In this regard, the first spring element is preferably effective for exerting a range of minimum and maximum forces $F_1$ that would be typical of the range of forces exerted during normal riding. These forces generally range from about 25 psi to about 150 psi depending on the weight of the rider. A general range for a typical rider of 160 lbs. would be from about 50 psi to about 125 psi. These minimum and maximum forces are used in calculating the required spring length L, core diameter D, and spring wire diameter d. In assembly, the spring 18 is received around the rod portion 40 so that it is captured between the bottom wall 24 of the container 22 and the flange portion 42 of the slide member 14. More specifically, the upper end of the spring 18 engages a washer 52 that sits around the rod portion 40 of the slide member 14 adjacent to the flange portion 42. Downward movement of the slide member 14 will thereby compress the spring 18.

The second spring element 20 also comprises a helical compression spring. However, this second spring is concentrically received around the first spring 18 (See FIG. 2). In this regard, the second spring 20 preferably has a shorter free length $L_{f2}$ (approximately 2 inches) and a wider core diameter $D_2$ (approximately 1.0 inch). The wire diameter $d_2$ will vary and is selected to produce the desired forces at minimum and maximum compression. More specifically, the second spring element 20 is preferably effective for exerting a range of minimum and maximum forces $F_2$ ($F_2 > F_1$) that would be typical of the range of forces exerted during jumping. These forces generally range from about 50 psi to about 400 psi depending on the weight of the rider and jump height. A general range for a typical rider of 160 lbs. would be from about 150 psi to about 300 psi depending on the height of the jump.

Since the housing assembly 12 is designed for easy disassembly, the spring elements 18 and 20 can be custom designed and installed according to the rider's weight, height of jumps, and riding style. In this regard, it should also be noted that the housing length and diameter, spring length, core diameter and wire diameter are all values that can be adapted to particular circumstances depending on changes in loading, deflection lengths of the spring, spring rates, desired size of the assembly, etc. With the factors of rider weight and jumping height being substantially constant in most cases, the spring elements can be individually selected and customized according to a rider's weight, height of jumps, and riding style. This is highly advantageous for marketing and sales purposes. The customization process can also be taken a step further to customized desired percentage loading. More specifically, in addition to customizing the device based on calculated F1 and F2 force, it is contemplated that most riders would opt to accommodate only a percentage of the total force. For example, if the F1 force was calculated to be a maximum of 150 psi a rider could select to begin spring compression at 100 psi and reach full stage 1 compression at 150 psi. Similar customization can be made with the F2 force and stage 2 compression. The above approach, which is only an example of the customization capability, would provide the rider with additional suspension capability other than what could be obtained through the flexion of the ankles, only when approaching the higher and more strenuous force levels. It is noted that the values provided herein are intended to represent examples as contemplated by the Applicant, and are not intended to limit the scope of the claims as defined hereinbelow.

Figure 2A:
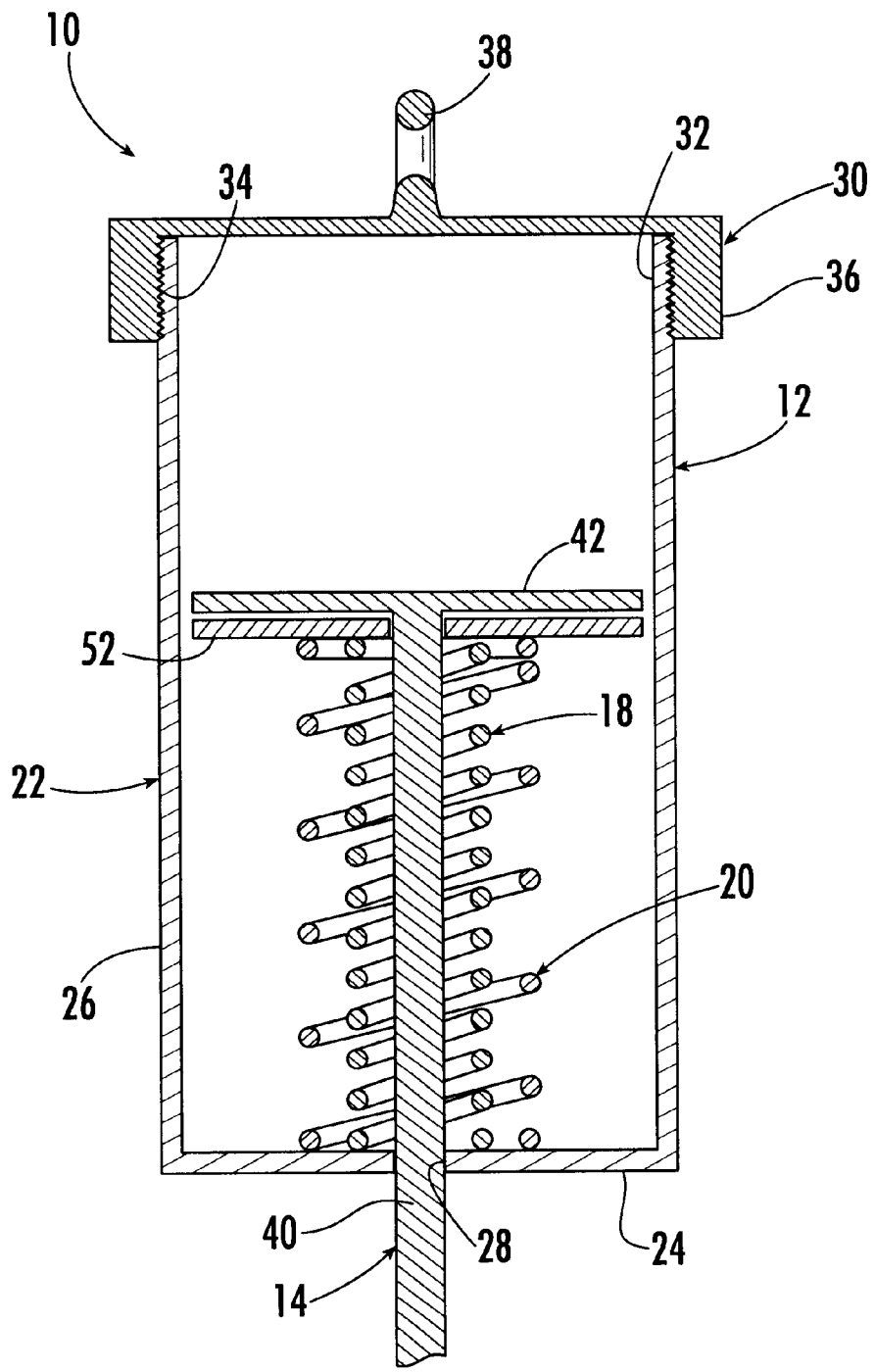
FIG. 2A is another cross-sectional views thereof showing compression of the springs.

Referring now to FIGS. 2 and 2A, during riding, the stirrup (not shown) will move up and down relative to the housing assembly 12 with the slide member 14 slidably moving up and down within housing assembly 12. The flange member 42 at the top of the slide member 14 compresses the first and second spring elements 18 and 20 upon downward movement corresponding to the exertion of a downward force on the stirrup. During normal riding, the first spring 18 is primarily active to counter the downward forces exerted. The first spring 18 will be compressed from a minimum load to a predetermined percentage of the maximum load (See FIG. 2A). When forces exerted during jumping exceed the predetermined percentage of the maximum force (load) on the first spring 18 under compression, the second spring 20 begins to compress to exert additional counter forces. The second spring 20 will thereafter exert forces through its range of minimum compression to maximum compression. In other words, when the forces are great enough to compress the first spring 18 through a predetermined range of compression, the flange 42 then engages the second spring 20 and begins compressing the second spring. In this extended compression, the first and second springs 18, 20 cooperate to exert a combined force against the flange 42. It is noted that there will be a maximum point of compression of the first spring 18 where the coils of the first spring will engage and limit any further compression of the second spring. This theoretical "spring solid" position must be taken into account in overall design and selection of the springs 18, 20) so that the first spring 18 does not reach a solid condition too early in the compression of the outer second spring 20.

Figure 4:
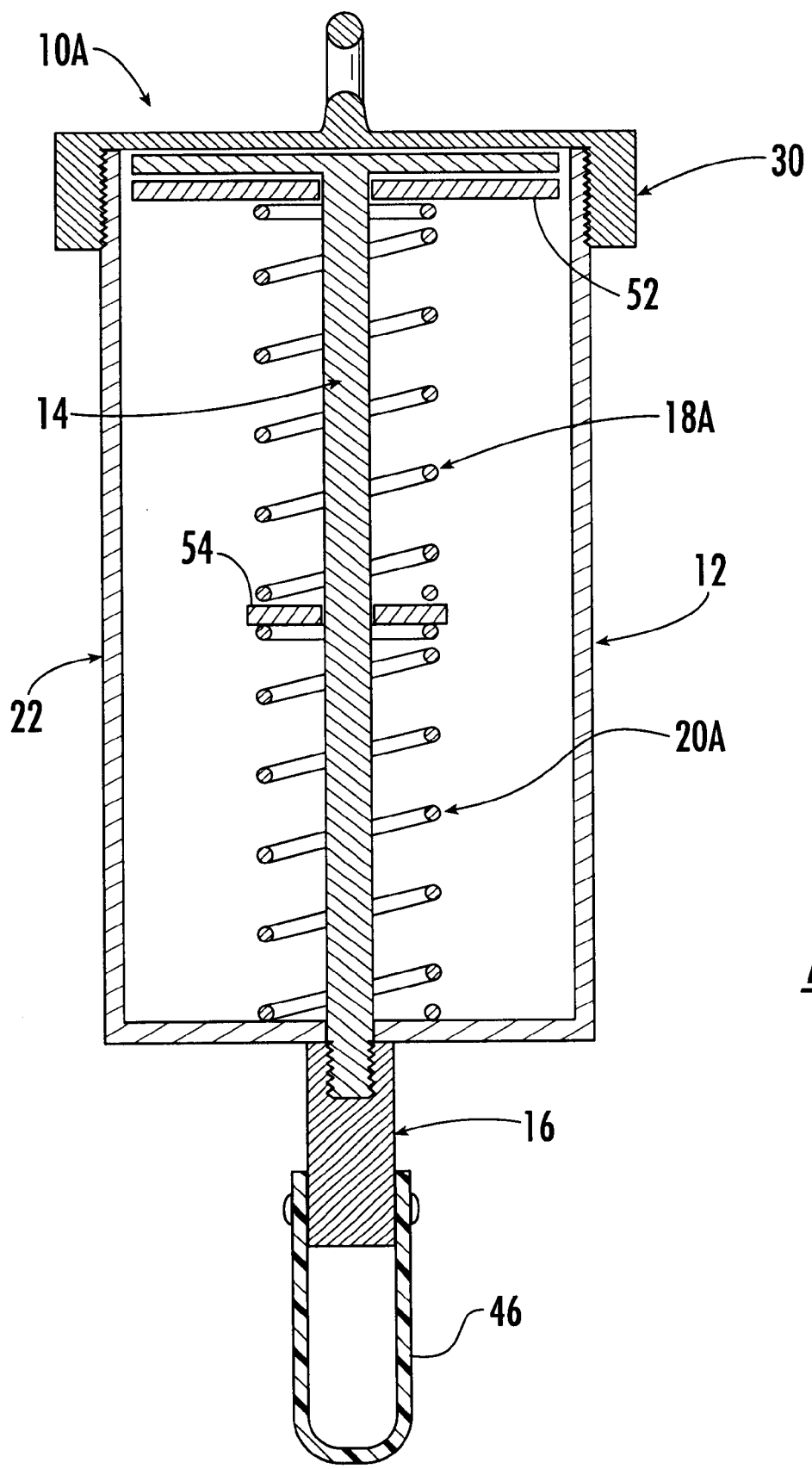
FIG. 4 is a cross-sectional view of an alternative spring configuration.

Referring now to FIG. 4, a second embodiment of the stirrup suspension is illustrated and generally indicated at 10A. The construction of the housing assembly 12, slide element 14, and all other members is identical to the first embodiment 10 with the exception of the spring configurations 18 and 20. In the second embodiment 10A, the first and second springs 18A and 20A are generally of the same length $L_f$ and the same core diameter D and are stacked one upon the other. Springs 18A and 20A are preferably separated by a washer 54. The upper spring 18A functions as the first spring 18 (lower spring rate) and the lower spring 20A functions as the second (higher spring rate) spring 20. The basic difference between these two springs 18A, 20A would likely be in the wire diameter d, with the second spring 20A having a larger wire diameter d to provide the higher spring rate needed. However, other configurations of the "stacked" spring embodiment are also possible. For example, the bottom spring 20A could have a wider core diameter D and/or have a different wire diameter d to provide a higher spring rate. In most cases the spring rates will be in different ranges, and there will be very little, if any, compression of the second spring until the forces reached the lower range of the second spring. For example, if the first spring is intended to move to full compression from 75 psi to 100 psi, and the second spring is designed to move to full compression from 200 psi to 250 psi, the second spring would not begin compression until the forces reached a minimum of 200 psi. It can be appreciated that many different combinations and customizations of the springs can be achieved with this type of construction.

It can therefore be seen that the rider of a horse can easily use the present stirrup suspension to improve his suspension capability beyond the boundaries of normal physical limitations. The suspension effectively improves rider balance, performance and safety without significant changes to riding style or existing equipment. The stirrup suspension is small and lightweight, and is easily and quickly installed between the saddle stirrup strap leather and the stirrup. In connection with potential design and marketing considerations, it is further contemplated that the stirrup (not shown) could be directly connected to, or integrated with, the slide member 14, thus eliminating the need for the stirrup connector 16 and connector strap 46. Furthermore, the stirrup suspension is designed so that it can be adapted to support the individual requirements of each rider based on body weight, riding style, jump heights, and performance desires. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A stirrup suspension comprising:
   a tubular housing having a bottom wall and continuous side wall extending upwardly from the bottom wall, said bottom wall having an opening therein, said side wall having an upper peripheral edge;
   a slide member slidably received within said housing, said slide including a rod having an upper end and a lower end, said upper end including a flange, said lower end extending through said opening in said bottom wall;
   a first spring element received around said slide member, said first spring element having a free length $L_{f1}$, said first spring element being effective for exerting a force $F_1$ under a minimum load; and a second spring element received around said slide member, said second spring element having a free length $L_{f2}$ that is less than $L_{f1}$, said second spring element being effective for exerting a force $F_2$ that is greater than $F_1$ under said minimum load, said slide member being slidably movable within said housing during riding wherein said flange member compresses said first and second spring elements.

2. The stirrup suspension of claim 1 further comprising a cap member mounted on said upper peripheral edge of said housing.

3. The stirrup suspension of claim 2 wherein said cap member is removable mounted on the upper peripheral edge of said housing.

4. The stirrup suspension of claim 3 wherein said upper peripheral edge of said side wall, and said cap each including corresponding mating formations for removably securing said cap to said upper peripheral edge of said side wall.

5. The stirrup suspension of claim 1 further comprising a stirrup connector coupled to the lower end of said slide member.

6. A stirrup suspension comprising:

a tubular housing having a bottom wall and continuous side wall extending upwardly from the bottom wall, said bottom wall having an opening therein, said side wall having an upper peripheral edge;

a slide member slidably received within said housing, said slide including a rod having an upper end and a lower end, said upper end including a flange, said lower end extending through said opening in said bottom wall;

a stirrup connector mounted to the lower end of said slide member;

a first spring element received around said slide member and captured between said bottom wall and said flange of said slide member, said first spring element having a free length $L_{f1}$ and diameter $D_1$, said first spring element being effective for exerting a force $F_1$ under a minimum load; and a second spring element received around said first spring element adjacent to the bottom wall of the housing, said second spring element having a free length $L_{f2}$ that is less than $L_{f1}$ and diameter $D_2$ that is greater than $D_1$, said second spring element being effective for exerting a force $F_2$ that is greater than $F_1$ under said minimum load, said slide member being slidably movable within said housing during riding wherein said flange member compresses said first and second spring elements, said first spring element absorbing downward forces under normal riding conditions, said first and second spring elements cooperating to absorb downward forces under jumping conditions.

7. The stirrup suspension of claim 6 further comprising a cap member mounted on said upper peripheral edge of said housing.

8. The stirrup suspension of claim 7 wherein said cap member is removable mounted on the upper peripheral edge of said housing.

9. The stirrup suspension of claim 8 wherein said upper peripheral edge of said side wall, and said cap each including corresponding mating formations for removably securing said cap to said upper peripheral edge of said side wall.

10. The stirrup suspension of claim 6 wherein said stirrup connector is removably mounted to the lower end of said slide member.

* * * * *